Figure 1:
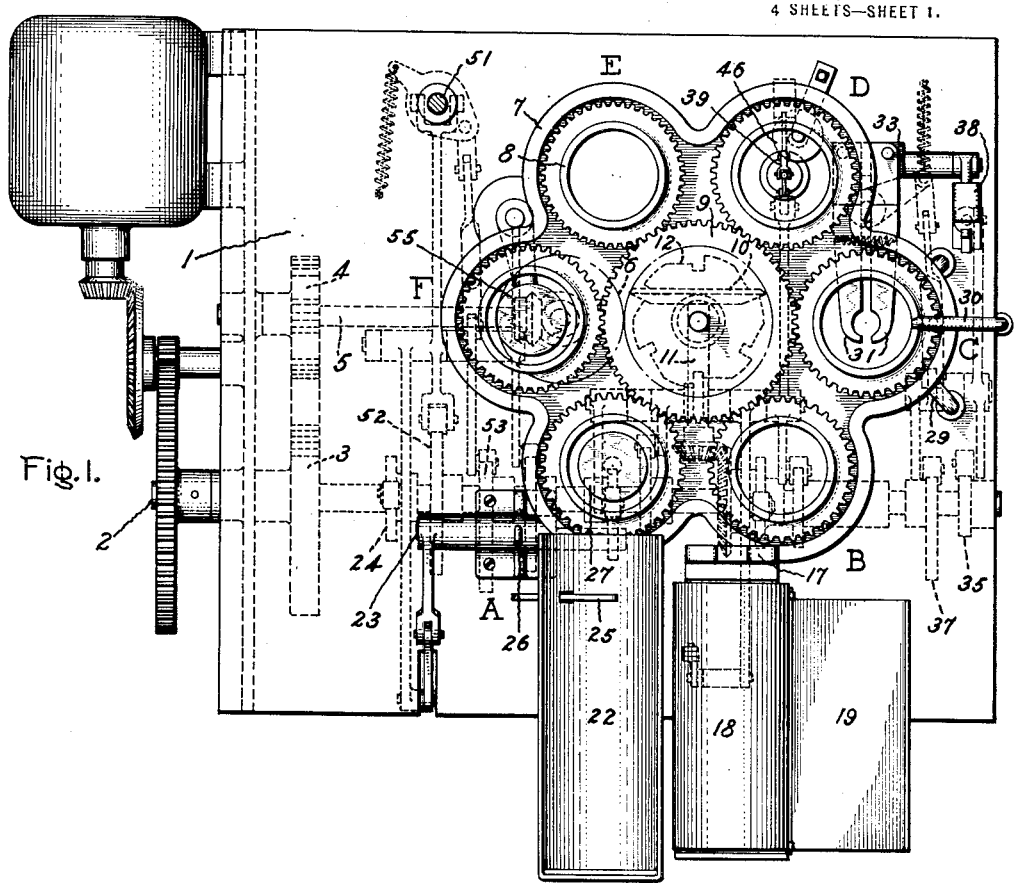

W. R. BURROWS.
METHOD OF AND APPARATUS FOR FINISHING BULBS.
APPLICATION FILED MAR. 31, 1919.

1,404,268.

Patented Jan. 24, 1922.

4 SHEETS—SHEET 1.

Inventor:
William R. Burrows,
by Albert G. Davis
His Attorney.

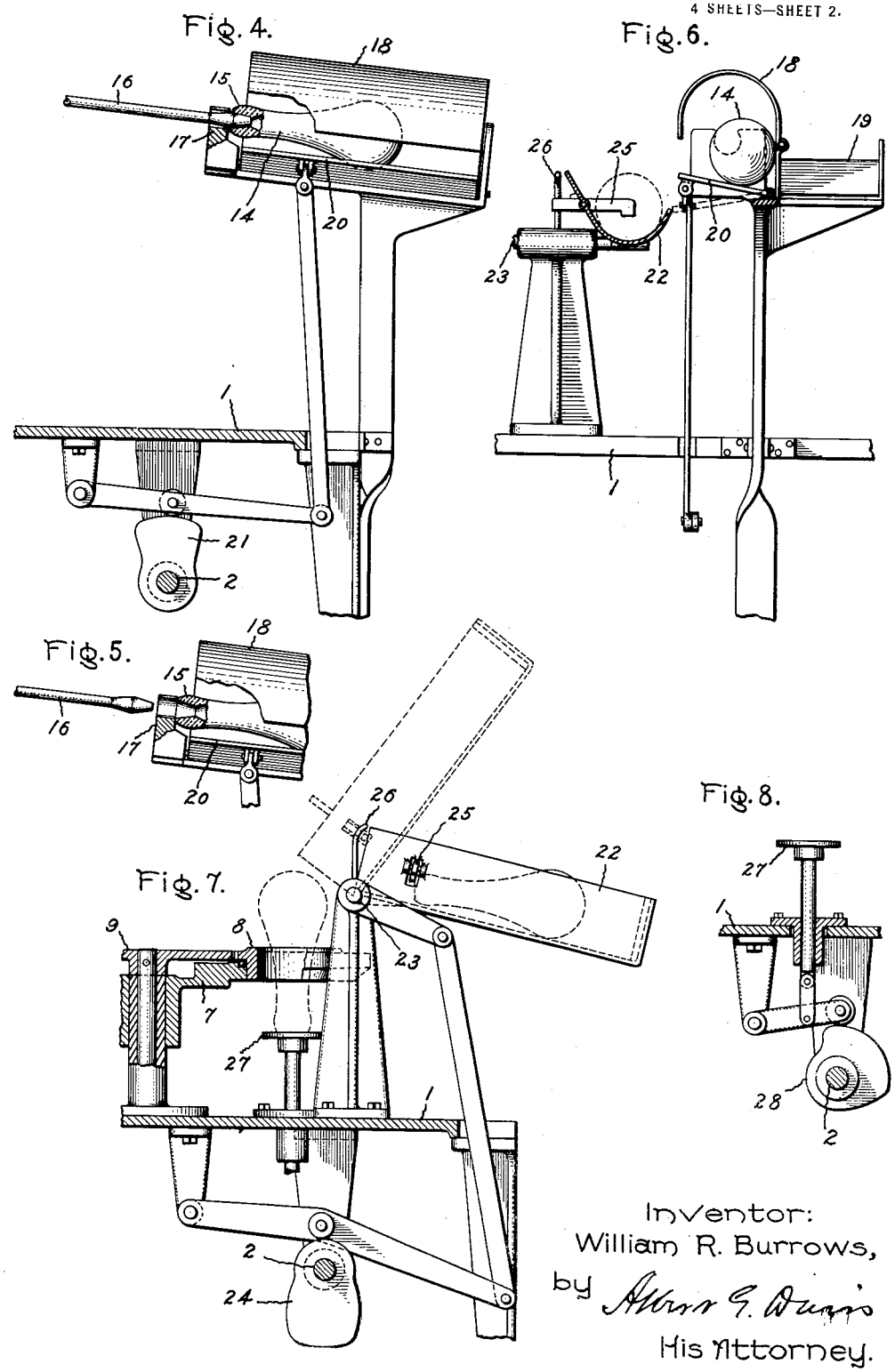

W. R. BURROWS.
METHOD OF AND APPARATUS FOR FINISHING BULBS.
APPLICATION FILED MAR. 31, 1919.

1,404,268.

Patented Jan. 24, 1922.

4 SHEETS—SHEET 3.

Inventor:
William R. Burrows,
by *Albert G. Davis*
His Attorney.

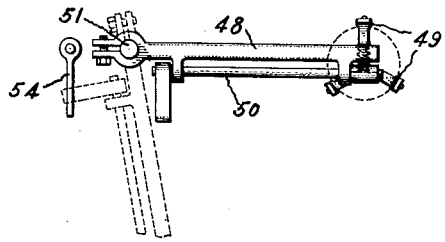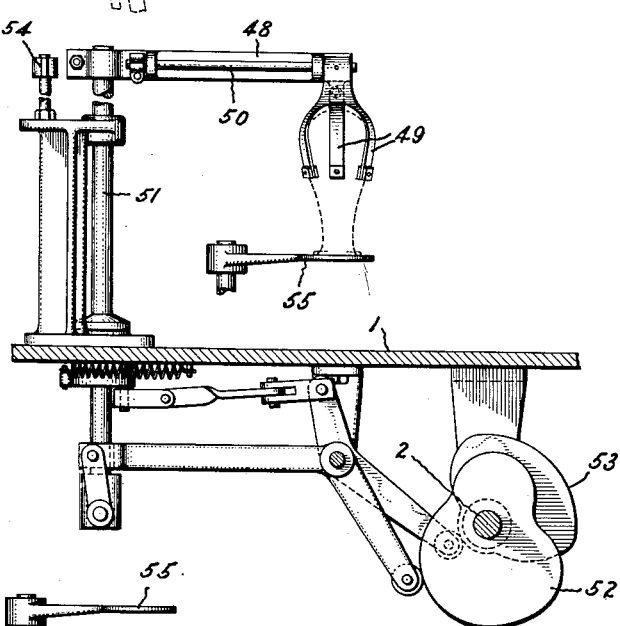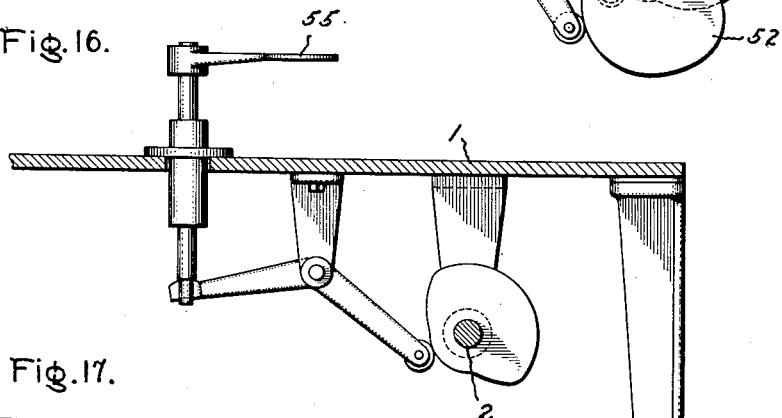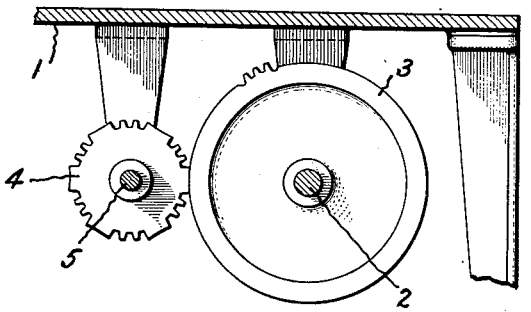

UNITED STATES PATENT OFFICE.

WILLIAM R. BURROWS, OF NEWARK, NEW JERSEY, ASSIGNOR TO GENERAL ELECTRIC COMPANY, A CORPORATION OF NEW YORK.

METHOD OF AND APPARATUS FOR FINISHING BULBS.

1,404,268.

Specification of Letters Patent. Patented Jan. 24, 1922.

Application filed March 31, 1919. Serial No. 286,593.

*To all whom it may concern:*

Be it known that I, WILLIAM R. BURROWS, a citizen of the United States, residing at Newark, county of Essex, State of New Jersey, have invented certain new and useful Improvements in Methods of and Apparatus for Finishing Bulbs, of which the following is a specification.

Incandescent lamp bulbs are usually blown with long necks having on the end a thick ring or mass of glass which adheres to the blow pipe during the blowing of the bulb, and which must be removed before the bulb can be used. To facilitate removal of this waste portion of the neck, the present practice is to form a convex swell or bead in the neck a short distance above the thick end. The bulbs are sent to the lamp factory just as they come from the mold, and at the lamp factory the waste end of the neck is cracked off by heating a thin line or zone on the crest of the swell or bead and then touching the heated bead to a cold iron or a moistened stone, thereby starting a crack which runs around the neck along the heated zone on the bead. The bead adds to the difficulty of blowing the bulb, as the body of the bulb is blown from very hot glass and requires an air pressure of only a few ounces per square inch. The thin walls of the neck cool somewhat during the blowing, so that when the bead or swell is finally formed the glass is comparatively cool and a pressure of three or four pounds per square inch is required. The shrinkage or breakage of bulbs in the bulb factory is great even when the bulbs are carefully annealed, because the thick mass of glass on the end of the neck of the freshly blown bulb sets up severe strains in the walls of the bulb during cooling. More breakage occurs in the lamp factory when the bulbs with strains in them are heated up in the cracking off operation and also because a crack which starts in the bead will often extend up the neck toward the body of the bulb instead of following the bead.

The object of my invention is to reduce the breakage of bulbs and similar articles of glassware. Another object is to produce bulbs more free from strain than the ordinary bulbs, and with necks of the proper length and a well finished edge. Still another object is to provide an improved method of and apparatus for removing the waste glass from the neck of bulbs and similar articles in the bulb factory. A further object is to eliminate the cracking off operation in the lamp factory. A still further object is to cheapen and improve the manufacture of incandescent lamp bulbs and similar articles of glassware.

A freshly blown bulb as it comes from the mold is so hot that it is free from permanent strains. By my method all of the glass working operations for removing the waste glass and preparing the bulb for use in the lamp factory are performed on a freshly blown bulb before it cools to the critical temperature of about 400° C. where permanent strains develop in it. No bead or swell to facilitate cracking off is necessary, as I remove the waste portion by heating a narrow zone on the neck of the freshly blown and hot bulb until the waste portion of the neck can be pulled off. In many cases I then finish the hot edge of the neck by reaming it out to the proper bore and smoothing up the edge while the glass is still plastic. The finished bulb thus produced is more free from strains than the bulbs heretofore used in the lamp factory, because it was blown with much less air pressure than required when a bead is formed and the use of this lower air pressure leaves less strains in the glass; because no thick mass of glass is attached to the end of the neck; and also because all of the glass working operations on the bulb were performed while it was still above the critical temperature and so hot as to be free from strains.

My invention may be carried out in various ways, but for the best results I provide an automatic or semi-automatic apparatus which is well adapted for the practice of my method of bulb making, and is also very useful in removing waste glass from any necked vessel. This apparatus automatically removes the waste end from the bulb, and then flares or reams out the neck and finishes the edge. In practicing my method with this apparatus the freshly blown bulb without a bead is stripped from the blow pipe or discharged from the automatic bulb blowing machine while still so hot as to be free from strain, immediately suspended neck down in a travelling head, and carried to the cutting off position, where cutting off fires heat a narrow zone on the neck and fingers seize the neck below the heated zone and exert enough pull by gravity to pull off the waste part below the heated zone. The bulb, still very hot, is carried to another position where the neck, still plastic, is flared or reamed out, if necessary, until the bore is of the proper size and the plastic edge is smooth. The glass working operations on the bulb are now completed, and for the first time the bulb is permitted to cool down to the critical temperature where strains may develop in it. The cool bulb with a smooth edged neck of the right length and size is eventually discharged from the apparatus ready to be used in the lamp factory.

Figure 2:
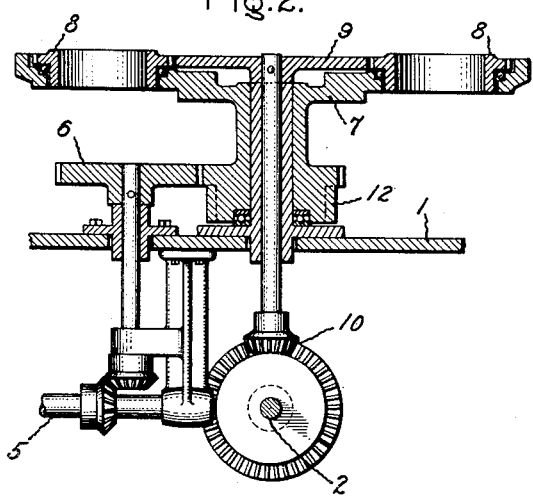
Figure 3:
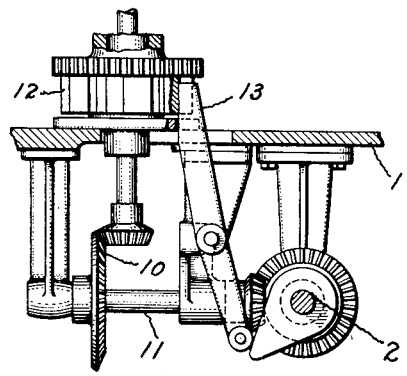
Figure 9:
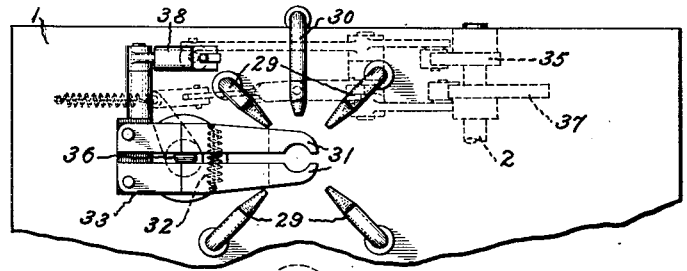
Figure 10:
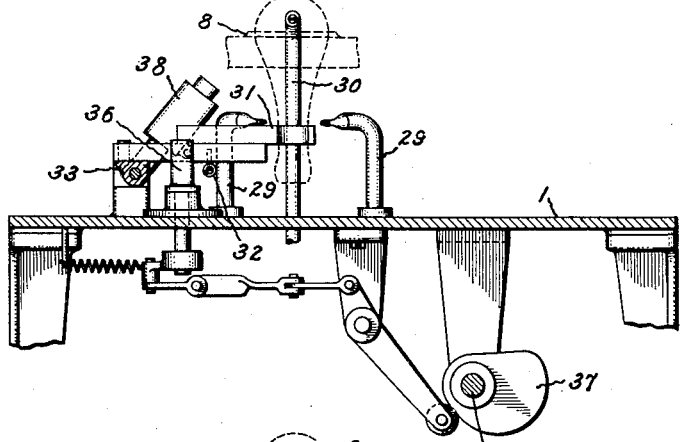
Figure 11:
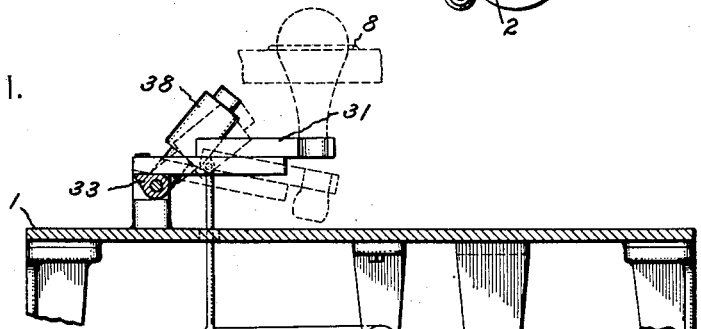
Figure 12:
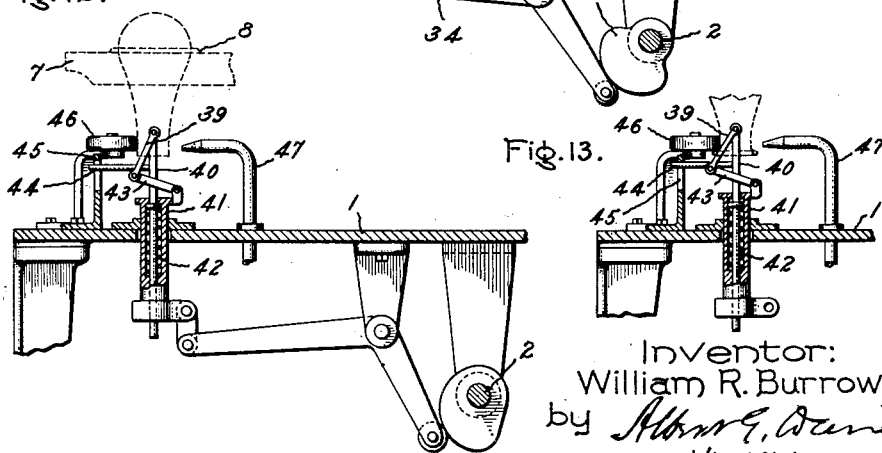
Figure 13:
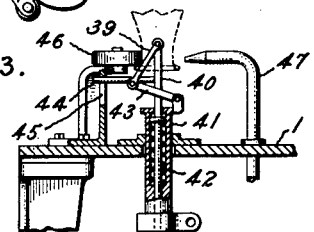

The novel features of my invention are pointed out with greater particularity in the appended claims, but the invention will best be understood in connection with the accompanying drawings, in which I have shown merely for purposes of illustration one of the various forms of apparatus suitable for the practice of my invention, and in which Fig. 1 is a view looking down upon the apparatus; Fig. 2 is a vertical section along the vertical axis of the bulb carrying turn-table; Fig. 3 is a view of the turn-table locking mechanism with certain parts broken away; Fig. 4 a side view of the bulb stripper and bulb magazine at the loading position of the apparatus, with a bulb ready to be stripped from the blow-pipe; Fig. 5 a view of the bulb stripper of Fig. 4 just after the bulb has been stripped from the blow-pipe; Fig. 6 an end view of the bulb magazine and feed chute at the loading position; Fig. 7 a side view of the feed chute and associated parts; Fig. 8 a view of the bulb buffer shown in Fig. 7; Fig. 9 a view looking down upon the cutting off burners and pull off fingers for removing the waste portion of the bulb; Fig. 10 a side view of the parts shown in Fig. 9 with the pull off fingers at the beginning of the cutting off operation; Fig. 11 a view similar to Fig. 10 but with the pull off fingers at the end of the cutting off operation; Fig. 12 a side view of parts of the flaring or reaming mechanism at the beginning of the flaring operation; Fig. 13 a view of the flaring mechanism at the end of the flaring operation; Fig. 14 a top view of the arm of the discharge or transfer mechanism; Fig. 15 a side view of the discharge or transfer mechanism; Fig. 16 a side view of the bulb ejector at the discharge position; and Fig. 17 a view of the intermittent gearing which gives the bulb turn-table a step by step motion.

In the particular apparatus shown in the drawings a horizontally movable bulb carrying mechanism is mounted on a base 1. A drive shaft 2 operates various parts of the apparatus by means of cams on the shaft, and also drives the bulb carrying mechanism through intermittent gears 3 and 4 between the drive shaft and a stub shaft 5. The intermittent motion of the stub shaft 5 is transmitted through bevel gears and a pinion 6 to the bulb carrying mechanism which automatically places each bulb in a number of different positions where the different glass working operations are performed.

The bulb carrying mechanism comprises a turn-table 7 with its hub geared to the intermittently rotating pinion 6. In the mechanism shown the turn-table is provided with six rotatable bulb holders or heads 8, each in the form of a tubular pinion mounted on the turn-table in a ball bearing and having a central opening of such a size that a bulb will be held in the head with the neck projecting below the head. All six heads are continuously rotated through a head driving gear 9 in mesh with all of the heads and driven through bevel gears 10 and a stub shaft 11 from the drive shaft 2.

To hold the turn-table 7 steady in the various positions, I provide a latching mechanism, best shown in Fig. 3, and comprising a notched wheel 12 on the hub of the turn-table and a cooperating detent 13 on the base. A cam on the drive shaft 2 holds the detent out of the notch while the intermittent gears 3 and 4 turn the table, and permits the detent to lock the notched wheel while the turn-table stands still.

The bulbs are placed in each head 8 at the loading position A. The apparatus can be used to great advantage in removing the waste glass from bulbs which have been allowed to cool just as they come from the mold, and if the bulbs are cold they may be loaded by hand. To facilitate the practice of my method and the loading of the bulbs into the cutting off apparatus while they are still hot, I provide an automatic loader. The apparatus can be used with any kind of bulb blowing machine, such as the semi-automatic machine which delivers to the operator a removable blow pipe with the bulb attached to it, or the full automatic machine which delivers the bulb detached from the blow pipe. I have shown the apparatus as used with a semi-automatic bulb blowing machine, and in this particular arrangement a freshly blown bulb 14 with the heavy ring or mass of glass 15 on the end of the neck is detached from the removable blow pipe 16 of the semi-automatic machine by a bulb stripper 17 in the form of a metal block with a notch just large enough for the blow pipe 16. The mass or ring of glass 15 which adheres to the blow pipe and forms the end of the neck of the freshly blown bulb is too large to pass through the notch of the stripper. The blow pipe with the freshly blown bulb on the end is taken from the bulb blowing machine by the operator, and placed in the stripper, as indicated in Fig. 4. The blow pipe 16 is then pulled through the notch of the stripper, as indicated in Fig. 5, the mass of glass 15 catches on the stripper, and the freshly blown hot bulb is pulled off the blow pipe by the stripper and left lying in a bulb magazine 18. If the bulb is defective it can be broken off the end of the blow pipe and left in a waste chute 19.

The hot bulb 14 in the magazine 18 is automatically loaded into a head 8 before it cools down appreciably and before strains develop in it. The hot bulb is removed from the magazine 18 in any suitable way, for example by means of a pivoted floor 20, which is lowered at the proper time by a cam 21 on the drive shaft 2, whereupon the hot bulb rolls into a tilting feed chute 22 in the position shown in full lines in Fig. 7. The feed chute is mounted on a pivot 23 at one end, and is lifted by a cam 24 on the drive shaft 2 into the position shown in dotted lines to cause the bulb to slide endwise out of the chute and into the head 8, where it is held with the neck down.

In some cases I provide the feed chute 22 with a pivoted gate 25 which prevents the bulb sliding out of the chute. The gate is automatically opened at the end of the tilting movement of the feed chute by means of a stationary lifter 26 which is caught by the projecting end of the pivot gate as the feed chute reaches the position shown in dotted lines.

To place the bulb in the head 8 with minimum shock I provide a vertically movable buffer block 27 actuated by the cam 28 so that it will be close to the bottom of the head 8, as shown in Fig. 8, when the bulb slides out of the chute 22, and will then slowly drop and gently lower the bulb into place in the head.

In the automatic loading device just described the freshly blown hot bulb is delivered to the feed chute, and then placed neck down in the rotating head 8 so quickly that it is placed in the head 8 at position A, and made ready for subsequent glass working operations while it is still far above the critical temperature at which strains develop.

As soon as the bulb is loaded at position A the turn-table 7 is automatically shifted one step to carry the hot bulb to the next position B, where the bulb is held for a short time until the air inside of it cools down slightly, although the bulb remains above the critical temperature at which strains develop. Unless this is done a thin film of glass sometimes forms across the neck of the bulb in subsequent operations, and is sucked up into the bulb by the cooling of the intensely heated air in the body of the bulb.

From position B the bulb is carried to the cutting off position C where a narrow zone on the neck of the bulb some distance above the end is heated by burners 29, which give a flat flame, until the glass in the narrow heated zone becomes so soft that the waste glass can easily be pulled off. At the same time a burner 30 directs a soft brush like flame on the top of the bulb to anneal it and keep it hot. If the glass is melted by the burners 29, the neck will shrink and perhaps collapse, and be closed up by a film of glass. In accordance with my invention I provide means for pulling off and removing the waste portion of the neck before the walls of the neck become soft enough to collapse and thereby remove the waste portion without causing a collapse or closing of the neck. To assist in pulling off the waste portion of the neck by gravity, I provide pull off fingers constructed and shaped to grasp the end of the neck below the heated zone and pull off the waste portion. In the particular arrangement which I prefer two horizontal pull off fingers 31 pivoted like the blades of a pair of scissors are held together by a spring 32. When a bulb arrives at the cutting off position C the pull off fingers automatically separate, rise with the neck of the bulb between them, then approach each other, and grip the neck just below the narrow heated zone, and then are left free to exert by their weight a strain tending to pull the waste end of the neck away from the remainder.

To permit the pull off fingers to rise and grasp the neck of the bulb and then exert a downward pull upon the end of the bulb, I pivot them upon a rocking block 33 which is rocked about a horizontal axis by a cam follower 34 and a plate cam 35 on the drive shaft 2. The fingers are opened and closed by a finger spreading cam, such as a vertical spreading cam 36, oval in cross section, and of such a length that as the pull off fingers rise and fall they slide lengthwise of the cam but do not get out of contact with it. The spreading cam is rotated by a plate cam 37 on the cam shaft 2, and spreads the fingers far enough apart so that they can easily pass over the neck of the bulb when the cam is crosswise.

As the bulb comes into the cutting off position C, the pull off fingers are down out of the way, as indicated in Fig. 9. The finger spreader cam 36 turns crosswise and spreads the fingers, and then the rocking block 33 raises the fingers into the position shown in Fig. 10, whereupon the spreader cam 36 turns back and permits the pull off fingers to be drawn toward each other by the spring and to grip the neck of the bulb just below the zone heated by the burners 29. Where the finger raising cam 35 on the shaft 2 runs out from under the end of the cam follower 34 the weight of the fingers and associated parts tends to pull off the waste end of the neck as soon as the glass has been softened by the flames of the burners 29 and before the neck of the bulb is hot enough to collapse and close. In some cases the weight of the fingers and of the cam follower 34 is not sufficient, and in such cases I provide an auxiliary weight 38 connected to the rocking block 33 and preferably set, as shown in Fig. 10, at such an angle that the effect of the weight increases as the fingers 31 drop, so that if the separation of the waste portion from the remainder of the bulb is started, it will surely be completed.

The bulb with the waste portion cut off is then carried to the flaring position D where the edge of the neck, still plastic from the heat of the burners 29, is flared or reamed out so as to insure that the neck of the bulb will be of the proper bore and that the edge will be smooth and rounded. For this operation I prefer to use a flaring or reaming device such as is shown in Fig. 12 and comprising a reamer 39 in the form of a pencil or wiper, preferably of carbon, pivoted at the upper end, and so mounted that it can be thrust into the neck of the bulb and then swung out laterally, so as to flare and smooth the edge of the neck. This movement of the reamer can be accomplished by various mechanisms, but in the preferred construction the reamer is pivoted at the upper end to a vertical rod 40 mounted in a vertically movable sleeve 41 and movable lengthwise of the sleeve, though normally held in the position shown in Fig. 12 by a spring 42 inside the sleeve. The lower end of the reamer 39 is swung out by means of a link 43 pivoted to the lower end of the reamer and to the sleeve 41. When the reamer rises into the neck of the bulb the parts are in the position shown in Fig. 12. The upward movement of the rod 40 is stopped at a definite point by a projection 44 on the rod engaging a fixed stop 45. The sleeve 41 rises further by compressing the spring 42, and through the link 43 throws the lower end of the reamer 39 out into the reaming position shown in Fig. 13. As a result of this action the neck of the bulb is flared out slightly and the edge is smoothed and rolled back into a well finished edge.

The neck may not flare out easily under all conditions and in some cases I provide an abutment or steadying means, such as a roller 46, for supporting the neck during the flaring operation and for resisting the sidewise thrust of the reamer 39. I may also facilitate the flaring and smoothing of the edge by heating the edge with an auxiliary burner 47 during the flaring operation.

At the conclusion of the flaring and reaming operations the bulb is finished so far as glass working in the bulb factory is concerned, and all of the glass working operations have been performed while the bulb was above the critical temperature at which strains develop in it. The finished bulb is now carried to the annealing position E, where it is allowed to cool down, and then to the final or discharge position F where it is removed from the apparatus.

A convenient form of automatic discharge or transfer mechanism for removing the finished bulb is illustrated in Figs. 14 and 15, in which a transfer arm 48 is provided at one end with gripping fingers 49, preferably flexible, and shaped to grasp the large end of a bulb. I prefer to provide these fingers with non-metallic tips, of wood or asbestos. The fingers are opened and closed by means of a rocker 50 which carries some of the fingers, while the others are rigidly attached to the arm 48. The transfer arm is mounted on a vertical rod 51 which is automatically raised and lowered by a cam 52, and also turned back and forth by a cam 53 on the drive shaft 2. As a head 8 arrives at the discharge position F, the rod 51 is lowered to bring gripping fingers 49 into position to get hold of the bulb, then raised vertically to lift the bulb out of the head, then swung horizontally, and then lowered into release position to discharge the finished bulb. To cause the fingers 49 to let loose of the bulb as the transfer arm 48 is lowered into the release position, I mount a stop 54 in the path of an arm on the rocker 50, to rock it and open the gripping fingers 49 until they drop the bulb. The transfer arm then rises and swings back, to the original position, ready to pick up the next bulb. To assist the discharge mechanism in getting hold of the bulb I provide a vertically movable bulb ejector 55 actuated from the drive shaft 2 and so timed that as soon as the head 8, with the finished bulb in it, stops in the discharge position F, the bulb ejector 55 begins to rise and pushes the bulb up out of the head. At the same time the gripping fingers 49 have been lowered into place immediately above the head, so that the bulb lifted out of the head 8 by the ejector 55, is pushed up into the resilient gripping fingers which spring open slightly and permit the bulge of the bulb to pass up beyond the tips of the fingers, thereby permitting the fingers to grasp the bulb and lift it out of the head as the transfer arm is raised.

What I claim as new and desire to secure by Letters Patent of the United States, is:—

1. The method of finishing a blown glass bulb while it is still so hot from the mold, as to be free from strains which consists in softening the neck of the hot bulb along a zone so narrow that the bore of the neck is not substantially reduced, and detaching the waste end of the neck from the bulb at said zone before the glass becomes cool enough to develop strains.

2. The method of finishing a blown glass bulb which consists in heating the neck of the bulb while still so hot from the molt as to be free from strains to substantially the melting point along a zone so narrow that the waste end is detached without substantial reduction in the diameter in the bore of the neck, and enlarging the hot end of the neck until it exceeds the minimum bore of the neck.

3. The method of finishing a freshly blown glass bulb which consists in melting off the surplus neck along a narrow zone while the glass of the bulb is still so hot from the mold as to be free from strains and reaming out the hot end of the neck until its bore is at least equal to that of the remainder of the neck.

4. The method of finishing a freshly blown glass bulb which consists in melting off the surplus neck along a narrow zone while the glass of the bulb is still so hot from the mold as to be free from strains and fire finishing the edge of the neck before the glass becomes cool enough to develop strains.

5. The method of finishing a freshly blown glass bulb while still so hot from the mold as to be free from strains which consists in fusing the neck along a zone so narrow that the waste end can be detached at said zone without substantial contraction of the neck and flaring the hot edge of the neck to form a funnel larger than the bore of the neck.

6. The method of finishing a blown glass bulb which consists in heating the neck of the bulb while it is still so hot from the mold as to be free from strains and thereby softening it along a zone so narrow that the neck does not collapse, and exerting lengthwise of the neck a pull sufficient to separate the waste end from the hot bulb at said zone before the glass cools enough to develop strains.

7. The method of finishing a blown glass bulb which consists in suspending the bulb with the neck down while it is still so hot from the mold as to be free from strains, softening the neck of the hot bulb along a zone so narrow that the neck does not collapse, and exerting by gravity a pull sufficient to detach the waste end of the bulb at said zone.

8. The method of finishing a blown glass bulb which consists in suspending the bulb with the neck down while it is still so hot from the mold as to be free from strains, softening the neck of the hot bulb along a zone so narrow that the neck does not collapse, and exerting by means of a weight a pull sufficient to separate the waste end from the bulb at said zone before the glass cools enough to develop strains.

9. In a machine of the character described, the combination with a traveling bulb holder and a heater for softening a zone on the neck of a bulb in said holder, of loading mechanism for depositing a bulb in said holder, detaching mechanism for pulling off the waste portion of the neck, smoothing mechanism for the edge of the neck, discharge mechanism for removing the bulb from the holder, and common actuating means for intermittently moving said holder into register with said mechanisms in succession and for actuating said mechanism while in register with the holder.

10. In a machine of the character described, the combination with a tubular bulb holder, of loading mechanism comprising a stripper for removing a freshly blown bulb from the blow pipe, a movable feed chute for receiving the bulb and placing it neck down in said holder, and common driving means for moving said holder and actuating said chute.

11. In a machine of the character described, the combination with a bulb holder, and a stripper for removing a bulb from the blow pipe, of loading mechanism comprising a magazine adjacent said stripper to receive the bulb, a feed chute adjacent said magazine for delivering a bulb to said holder, and means for transferring a bulb from said magazine to said chute.

12. In a machine of the character described, the combination with a tubular bulb holder, of loading mechanism comprising a stripper for removing a freshly blown bulb from the blow pipe, a tiltable feed chute mounted to receive the bulb and to slide it endwise into said holder when said chute is tilted, a vertically movable buffer for the neck of the bulb immediately below said holder and in position when raised to keep the bulb out of the holder, and driving means for tilting said chute and subsequently lowering said buffer to lower the bulb gently into the holder.

13. In a machine of the character described, the combination with a vertical tubular bulb holder mounted to move horizontally, of a vertically movable bulb buffer below the path of said holder, and common actuating means for moving said holder into alignment with said buffer and for raising and lowering said buffer while in alignment.

14. In a machine of the character described, the combination with a tubular bulb holder, of a tilting feed chute mounted to deliver a bulb neck down into said holder, a gate across the lower end of said chute, and means for automatically opening said gate as said chute moves into delivery position.

15. In a machine of the character described, the combination with a tubular bulb holder, of a tilting feed chute mounted to deliver a bulb neck down into said holder, a gate pivoted on said chute to normally close its lower end, and a stop mounted to engage and open said gate as said chute tilts into delivery position.

16. In a machine of the character described, the combination with a movable bulb holder for holding a bulb in vertical position and burners for heating a narrow zone on the neck of the bulb in said holder, of pulling off means mounted adjacent the path of the end of the neck of said bulb for grasping the waste end of the neck and pulling lengthwise of the neck to sever the neck at said zone, and, actuating mechanism for bringing said bulb holder into operative relation to said pulling off means and for automatically actuating said pulling off means to pull off the waste end of the neck.

17. In a machine of the character described, the combination with a travelling bulb holder for holding a bulb in vertical position, and burners for heating a narrow zone on the neck of the bulb, of pull off fingers mounted adjacent said burners and movable in a direction to exert a pull longitudinally of the neck when applied to the neck, and common actuating means for said bulb holder and said fingers for moving said holder and automatically applying said fingers to the waste end of the neck.

18. In a machine of the character described, the combination with a bulb holder for holding a bulb in vertical position, and burners for heating a narrow zone on the neck of the bulb, of cooperating fingers relatively movable horizontally to open and close and bodily movable vertically, said fingers being weighted to exert by gravity a pull on the neck, opening means for separating said fingers, lifting means for moving said fingers vertically into position to grasp the waste portion of the neck, and, actuating mechanism for said opening means and said lifting means for automatically opening said fingers, moving them while open into position to grasp the waste portion of the neck, and then closing them on the neck.

19. In a machine of the character described, the combination with a bulb holder for holding a bulb in vertical position, and burners for heating a narrow zone on the neck of the bulb, of a vertically movable member constructed to engage the waste end of the neck, and actuating mechanism for automatically lifting said member and attaching it to the waste end of the neck and then leaving it free to descend by gravity.

20. In a machine of the character described, the combination with a bulb holder for holding a bulb in vertical position, and burners for heating a narrow zone on the neck of the bulb, of a block tiltable about a horizontal axis, a pair of fingers pivoted on said block to move horizontally, a vertical cam between said fingers and rotatable about a vertical axis to open and close them, tilting means for positively tilting said block to raise the fingers and comprising a lost motion connection to permit said block to remain tilted with said fingers raised, and common driving means for turning said vertical cam to open said fingers, actuating said tilting means to raise the opened fingers, turning said vertical cam to close said fingers, and actuating said tilting means to leave said block free to tilt and lower said fingers by gravity.

21. In a machine of the character described, the combination with a traveling bulb holder for holding a bulb with the neck down, burners mounted adjacent the path of said holder to heat a narrow zone on the neck and sever the waste end of the neck, a radially movable flaring tool for expanding the bore of the neck and flaring its edge, and an abutment for sustaining the neck in position against the radial thrust of the flaring tool.

22. In a machine of the character described, the combination with a traveling bulb holder for holding a bulb with the neck down, burners mounted adjacent the path of said holder to heat a narrow zone on the neck and sever the waste end of the neck, a radially movable flaring tool for expanding the bore of the neck and flaring its edge, and a wheel mounted in position to bring its rim against the neck of the bulb in the line of thrust exerted by said tool during the flaring operation.

In witness whereof, I have hereunto set my hand this 10th day of March, 1919.

WILLIAM R. BURROWS.

Certificate of Correction.

It is hereby certified that in Letters Patent No. 1,404,268, granted January 24, 1922, upon the application of William R. Burrows, of Newark, New Jersey, for an improvement in "Methods of and Apparatus for Finishing Bulbs," errors appear in the printed specification requiring correction as follows: Page 5, line 2, claim 2, for the word "molt" read *mold;* page 6, line 36, claim 18, after the word "and" insert the word *common;* and that the said Letters Patent should be read with these corrections therein that the same may conform to the record of the case in the Patent Office.

Signed and sealed this 17th day of April, A. D., 1922.

[SEAL.] KARL FENNING,
*Acting Commissioner of Patents.*